(12) United States Patent
Swales et al.

(10) Patent No.: US 8,276,725 B2
(45) Date of Patent: Oct. 2, 2012

(54) SELECTABLE ONE-WAY CLUTCH

(75) Inventors: Shawn H Swales, Canton, MI (US); Scott H. Wittkopp, Ypsilanti, MI (US); Norman Schoenek, Novi, MI (US)

(73) Assignee: GM Global Technology Operations LC, Detroit, MI (US)

( * ) Notice: Subject to any disclaimer, the term of this patent is extended or adjusted under 35 U.S.C. 154(b) by 704 days.

(21) Appl. No.: 12/505,977

(22) Filed: Jul. 20, 2009

(65) Prior Publication Data

US 2011/0011694 A1    Jan. 20, 2011

(51) Int. Cl.
*F16D 41/16*    (2006.01)
(52) U.S. Cl. ..... 192/43.1; 192/46; 192/69.1; 192/84.21; 192/84.92
(58) Field of Classification Search ................ 192/84.2, 192/84.21, 84.92
See application file for complete search history.

(56) References Cited

U.S. PATENT DOCUMENTS

| | | | | |
|---|---|---|---|---|
| 5,996,758 | A * | 12/1999 | Baxter, Jr. ................. | 192/84.31 |
| 6,290,044 | B1 | 9/2001 | Borgman et al. | |
| 6,814,201 | B2 * | 11/2004 | Thomas ...................... | 192/43.1 |
| 7,540,365 | B2 * | 6/2009 | Juergensmeyer et al. ... | 192/84.2 |
| 2006/0237276 | A1 * | 10/2006 | Jegatheeson ................ | 192/46 |
| 2007/0163853 | A1 | 7/2007 | Wittkopp | |
| 2007/0278061 | A1 | 12/2007 | Wittkopp et al. | |
| 2008/0169165 | A1 | 7/2008 | Samie et al. | |
| 2008/0223681 | A1 | 9/2008 | Stevenson et al. | |
| 2009/0084653 | A1 * | 4/2009 | Holmes ...................... | 192/41 A |

* cited by examiner

*Primary Examiner* — David D Le
*Assistant Examiner* — Ryan Dodd

(57) ABSTRACT

A clutch for transmitting torque between a first member and a second member includes a locking plate having an engagement groove, a carrier disposed adjacent the locking plate, an engagement member rotatably supported in an aperture of the carrier, an apply biasing element, a release plate, a release biasing element, and an electromagnet. The engagement member is rotatable between an engagement position and a release position.

20 Claims, 3 Drawing Sheets (SECTION F-F)

(SECTION E-E)

(SECTION F-F)

SELECTABLE ONE-WAY CLUTCH

TECHNICAL FIELD

The present disclosure relates to clutches having selectively variable modes of operation, and more particularly to a clutch having an electromagnet actuator for selectively initiating variable modes of operation.

BACKGROUND

The statements in this section merely provide background information related to the present disclosure and may or may not constitute prior art.

Automatic transmissions provide a plurality of forward and reverse speed or gear ratios by selectively actuating one or more brakes or clutches. One type of brake or clutch useful in automatic transmissions is known as a selectable one-way clutch. A selectable one-way clutch is similar to a basic one-way clutch, which includes a "locked" mode in one rotational direction and a "freewheel" mode in the opposite rotational direction. In the basic one-way clutch, the operating mode is determined by the direction of the torque being applied to the input member. A selectable one-way clutch is further capable of producing a driving connection between an input member and an output member in one or both rotational directions and is also able to freewheel in one or both rotational directions as needed. As an example, a selectable one-way clutch may be implemented to transfer torque from an engine to the transmission, and to interrupt the transfer of reverse torque from the transmission to the engine.

Typical selectable one-way clutches in automatic transmissions often employ a high pressure hydraulic control system that is used to actuate the selectable one-way clutch. However, there are applications, such as hybrid electric vehicles, that may not otherwise require a high pressure hydraulic control system. Thus, there is a need for a new and improved selectable one-way clutch that does not require a high pressure hydraulic system for actuation.

SUMMARY

In an aspect of the present disclosure, a clutch for transmitting torque between a first member and a second member is provided. The clutch includes a locking plate, a carrier, a first engagement member, a first apply biasing element, a first release plate, a first release biasing element, and a first electromagnet. The locking plate includes a first engagement groove. The carrier is disposed adjacent the locking plate and the carrier includes a first aperture. The first engagement member is rotatably supported in the first aperture of the carrier and has an actuating portion and an engagement portion. The first engagement member is rotatable into an engagement position and a release position, where the engagement portion of the first engagement member is disposed in the first engagement groove when the first engagement member is in the engagement position. The first apply biasing element includes an apply force for rotating the first engagement member into the engagement position. The first release plate is in communication with the actuating portion of the first engagement member. The first release biasing element includes a release force for rotating the first engagement member into the release position. The first electromagnet is disposed proximate the first release plate and includes an electromagnetic force. The first engagement member is in the engagement position when a combination of the apply force and the electromagnetic force is greater than the release force, and the first engagement member is in the release position when the release force is greater than the combination of the apply force and the electromagnetic force.

In another aspect of the present disclosure, the clutch further includes a second engagement groove in the locking plate, a second aperture in the carrier, a second engagement member disposed in the second aperture and opposing the first engagement member, a second apply spring disposed within the second aperture, a second release plate adjacent the carrier, a second release biasing element, and a second electromagnet disposed proximate the second release plate.

In yet another aspect of the present disclosure, the first release plate and the second release plate are concentric annular members.

In yet another aspect of the present disclosure, the first release plate further includes an inner diameter and a first actuation portion disposed inside the inner diameter and the second release plate further includes an outer diameter and a second actuation portion disposed outside of the outer diameter.

In yet another aspect of the present disclosure, the first actuation portion includes an insertion portion in contact with the actuation portion of the first engagement member and the second actuation portion includes a second insertion portion in contact with a second actuation portion of the second engagement member.

In yet another aspect of the present disclosure, the clutch further includes a first electromagnet housing disposed over the first electromagnet and a second electromagnet housing disposed over the second electromagnet.

In yet another aspect of the present disclosure, the first electromagnet housing includes a first shelf portion and the second electromagnet housing includes a second shelf portion, wherein the first release biasing member is disposed on the first shelf portion and second release biasing member is disposed on the second shelf portion.

In yet another aspect of the present disclosure, the first release biasing member and the second release biasing member are Belleville springs.

In yet another aspect of the present disclosure, the carrier includes a rotation portion adjacent the first aperture that defines the axis of rotation of the first engagement member.

In yet another aspect of the present disclosure, the clutch further includes a plurality of first engagement members and a plurality of second engagement members.

In yet another aspect of the present disclosure, a distance between the first engagement groove and the second engagement groove is substantially the same as a distance between the first engagement member and the second engagement member.

In yet another aspect of the present disclosure, the carrier has a shelf portion adjacent the first aperture and the first apply biasing element is a coil spring disposed between the shelf portion and the engagement portion of the first engagement member.

In yet another aspect of the present disclosure, the first engagement groove has a profile that is substantially the same as a partial profile of the first engagement member within the first engagement groove.

In yet another aspect of the present disclosure, a clutch for transmitting torque between a first member and a second member in a vehicle is provided. The clutch includes a locking plate, a carrier, a pair of opposing engagement members, a pair of apply biasing elements, a pair of release plates, a pair of release biasing elements, and a pair of electromagnets. The locking plate includes a pair of engagement grooves. The carrier is disposed adjacent the locking plate and includes a pair of apertures. The pair of opposing engagement members is rotatably supported in the pair of apertures of the carrier. The pair of engagement members each include an actuating portion and an engagement portion, where each of the pair of engagement members is rotatable into an engagement position and a release position, and where the engagement portion of at least one of the pair of engagement members is disposed in one of the pair of engagement grooves in the engagement position. The pair of apply biasing elements each include an apply force for rotating one of the pair of engagement members into the engagement position. The pair of release plates are each in communication with the actuating portion of one of the pair of engagement members. The pair of release biasing elements each include a release force for rotating one of the pair of engagement members into the release position. The pair of electromagnets is disposed proximate the release plate, and each of the pair of electromagnets include an electromagnetic force. Each of the pair of engagement members moves to the engagement position when a combination of the apply force and the electromagnetic force is greater than the release force, and each of the engagement members moves to the release position when the release force is greater than the combination of the apply force and the electromagnetic force.

In yet another aspect of the present disclosure, the pair of release plates are concentric annular plates.

In yet another aspect of the present disclosure, the release biasing elements are concentric Belleville springs.

In yet another aspect of the present disclosure, the clutch further includes a pair of electromagnetic housings disposed over the pair of electromagnets, and wherein the pair of electromagnetic housings are rotatable relative to the pair of electromagnets.

In yet another aspect of the present disclosure, the carrier further includes a shelf portion and the pair of apply biasing elements are disposed on the shelf portion.

In yet another aspect of the present disclosure, the clutch further includes a plurality of pairs of opposing engagement members.

In yet another aspect of the present disclosure, the pair of engagement grooves have profiles that are substantially the same as a profiles of the pair of opposing engagement members within the locking plate when the pair of opposing engagement members are in the engagement positions.

Further areas of applicability will become apparent from the description provided herein. It should be understood that the description and specific examples are intended for purposes of illustration only and are not intended to limit the scope of the present disclosure.

DESCRIPTION OF THE PREFERRED EMBODIMENTS

Figure 1:
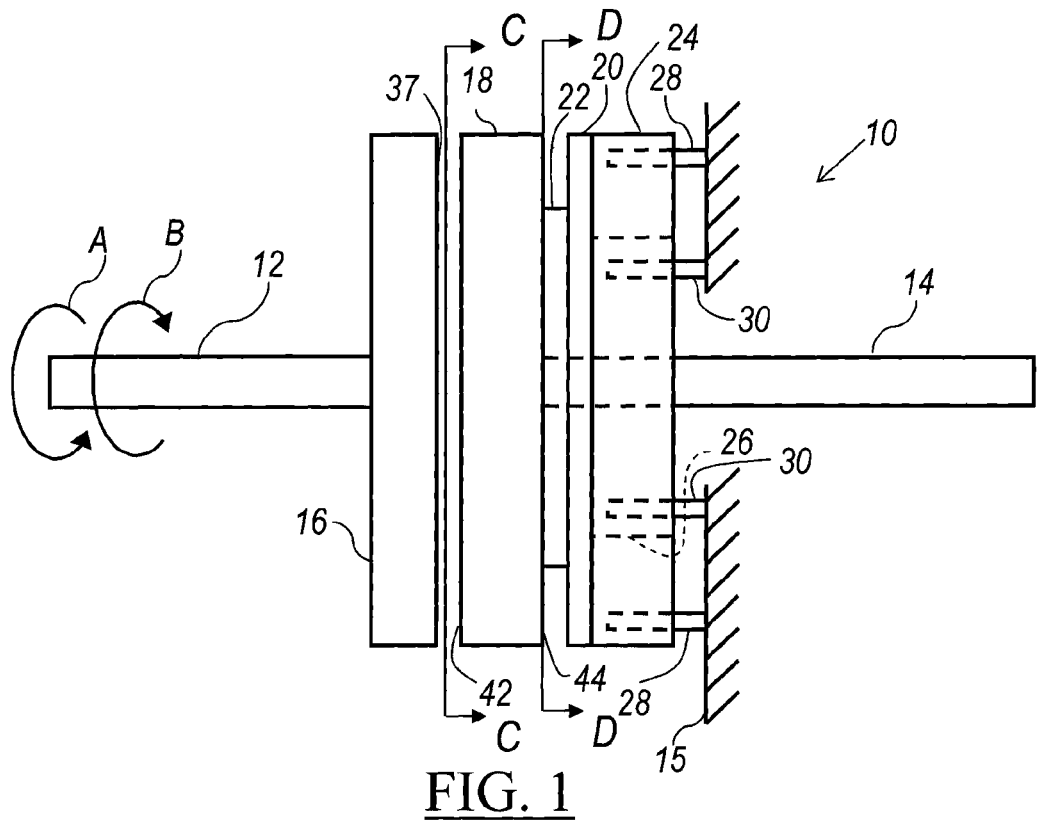
FIG. 1 is a side view of a clutch between a drive shaft and a driven shaft in accordance with an embodiment of the present disclosure.

Referring to the drawings, wherein like reference numbers refer to like components, in FIG. 1 a side view of a clutch 10 is illustrated, in accordance with an embodiment of the disclosure. The clutch 10 is generally disposed between a first shaft 12 and a second shaft 14. In the example provided, the first shaft 12 will drive, be driven by, or freely rotate relative to the second shaft 14 in either a first rotational direction A or a second rotational direction B, as will be described below. In the example provided, the first shaft 12 and the second shaft 14 are components in a multi-mode Electrically Variable Transmission (EVT), an automatic transmission that executes synchronous shifts. The EVT has a housing 15 that is a transmission housing in automobile. However, other housings do not depart from the scope of the present disclosure, and the clutch 10 may be employed between any two fixed or rotating members within any type of transmission without departing from the scope of the present disclosure.

The clutch 10 generally includes a locking plate 16, a carrier 18, an outer or first release plate 20, an inner or second release plate 22, an outer or first electromagnet housing 24, an inner or second electromagnet housing 26, an outer or first electromagnet 28, and an inner or second electromagnet 30.

Figure 2:
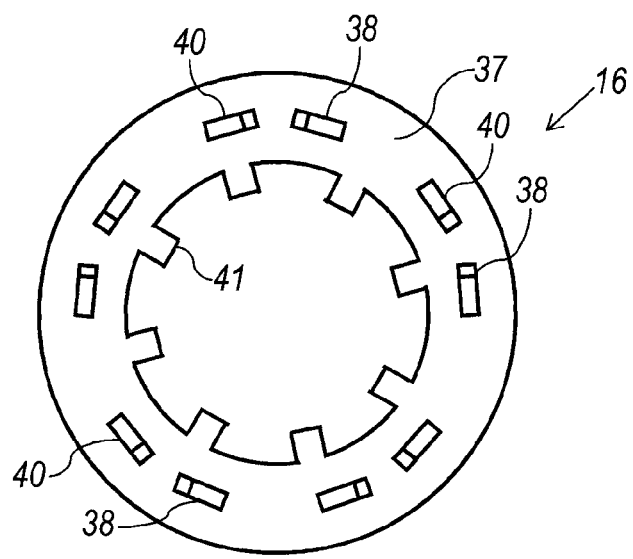
FIG. 2 is a front view of a locking plate in accordance with the present disclosure.
Figure 6:
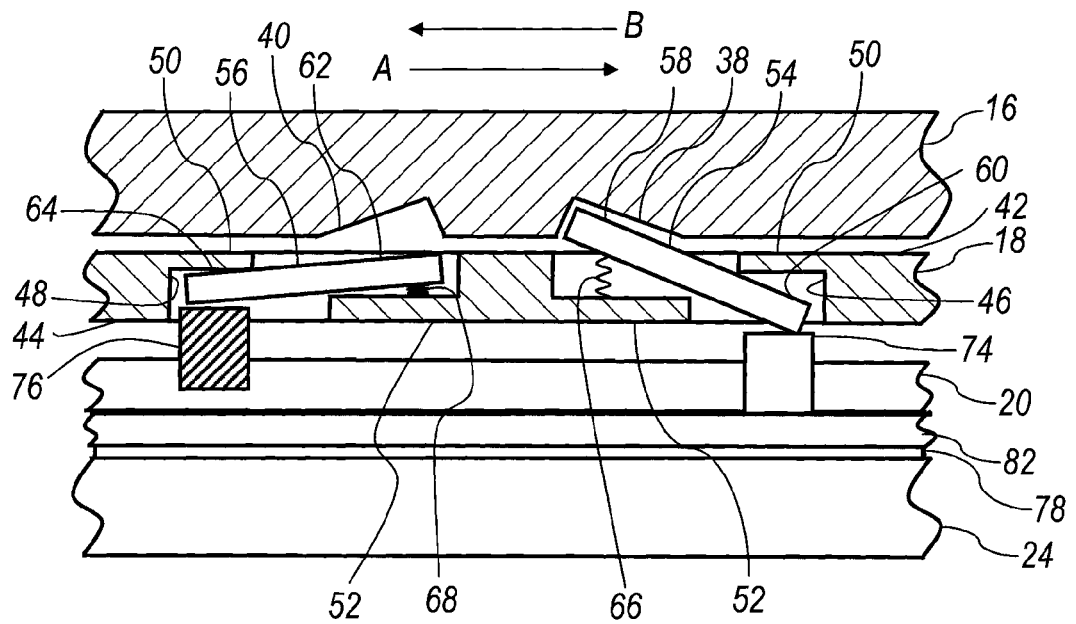
FIG. 6 is a cross-sectional view of the clutch, taken in the direction of arrow F-F in FIG. 3, in accordance with the present disclosure.

Referring now to FIGS. 2 and 6, a front view and a cutaway view of the locking plate 16 are shown, in accordance with an embodiment of the disclosure. The locking plate 16 is coupled to and rotatable with the first shaft 12. The locking plate 16 is generally annular and includes a locking surface 37. A plurality of first engagement grooves 38 and a plurality of second engagement grooves 40 are disposed on the locking surface 37. The first engagement grooves 38 and the second engagement grooves 40 extend axially from the locking surface 37 into the locking plate 16. The engagement grooves 38, 40 preferably have an angled profile, as best seen in FIG. 6. The engagement grooves 38, 40 are disposed around the circumference of the locking plate 16 and preferably alternate with respect to one another. In the example provided, the engagement grooves 38, 40 are included as five pairs, where each pair includes one first engagement groove 38 and one second engagement groove 40. However, it should be appreciated that other arrangements and numbers of engagement grooves 38, 40 may be used without departing from the scope of the present disclosure. As previously stated, the locking plate 16 is rotationally coupled to the first shaft 12. For example, the locking plate 16 has splines 41 in engagement with splines (not shown) on the first shaft 12. However, other methods of rotationally coupling the first shaft 12 and the locking plate 16 may be employed without departing from the scope of the present disclosure.

Figure 3:
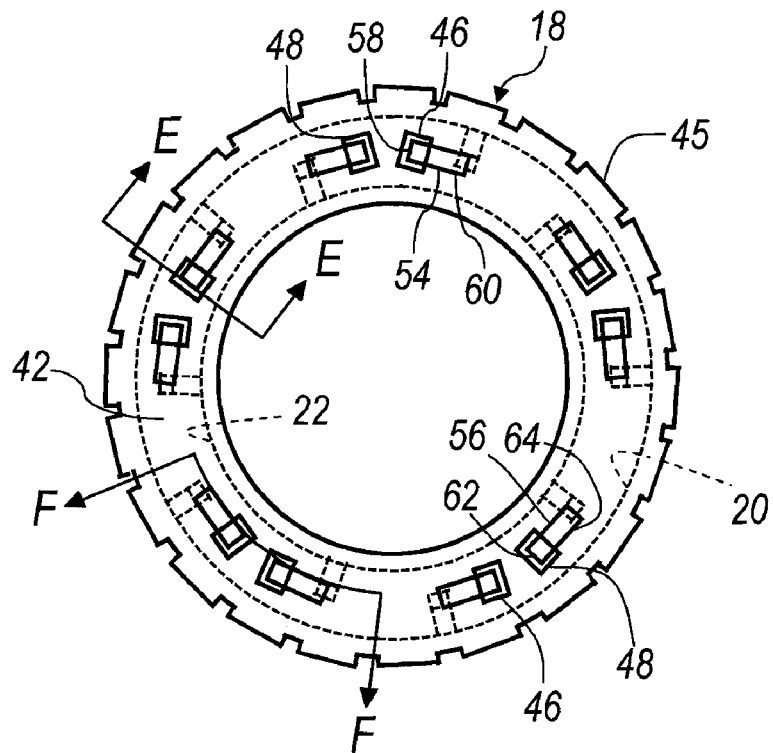
FIG. 3 is a front view, taken in the direction of arrow C-C in FIG. 1, of a carrier of the clutch in accordance with the present disclosure.

Referring now to FIGS. 3 and 6, a front view and a cutaway view of the carrier 18 are shown, in accordance with an embodiment of the disclosure. The carrier 18 is disposed adjacent the locking plate 16. The carrier 18 includes a carrier face 42 and a bottom face 44. The carrier face 42 opposes the locking surface 37 of the locking plate 16 (see FIG. 1). The carrier 18 is rotationally coupled to the second shaft 14. For example, the carrier 18 has splines 45 in engagement with splines (not shown) on the second shaft 14. However, other methods of rotationally coupling the second shaft 14 and the carrier 18 may be employed without departing from the scope of the present disclosure.

The carrier 18 defines a plurality of first apertures 46 and a plurality of second apertures 48. The first and second apertures 46, 48 generally extend from the carrier face 42 to the bottom face 44. In the example provided, the apertures 46, 48 are radially centered on the carrier face 42 of the carrier 18. However, the apertures 46, 48 may be disposed in other locations without departing from the scope of the present disclosure. A circumferential distance between the first and second apertures 46, 48 is preferably the same as a circumferential distance between the first and second engagement grooves 38, 40 of the locking plate 16 (see FIG. 2). The apertures 46, 48 include a rotation portion 50 and a lower support portion 52. The rotation portion 50 is proximate the carrier face 42 and projects circumferentially into the first apertures 46 in the B direction and into the second apertures 48 in the A direction. The lower support portion 52 is proximate the lower carrier face 44 and projects into the first apertures 46 in the A direction and into the second apertures 48 in the B direction.

A first engagement member 54 is disposed in each of the first apertures 46 and a second engagement member 56 is disposed in each of the second apertures 48. The engagement members 54, 56 are generally long rigid members aligned axially along a tangent of a radius of the carrier 18. The first engagement member 54 includes a first engagement portion 58 and a first release portion 60. The second engagement member 56 includes a second engagement portion 62 and a second release portion 64. The engagement portions 58, 62 are proximate the lower support portion 52 of the carrier 18 within the apertures 46, 48. The release portions 60, 64 are proximate the rotation portion 50 within the apertures 46, 48. Accordingly, the engagement members 54, 56 oppose each other, with either the engagement portions 58, 62 or the release portions 60, 64 facing each other. In the example provided, the engagement members 54, 56 contact the rotation portion 50 between the engagement portions 58, 62 and the release portions 60, 64 as a point of rotation. However, it should be appreciated that the engagement members 54, 56 may be rotatably supported in other ways, such as by pins, without departing from the scope of the present disclosure.

The engagement members 54, 56 are positionable between an engagement position and a release position. The engagement position, as shown by the first engagement member 54 in FIG. 6, has the engagement portion 58 of the first engagement member 54 disposed outside of the aperture 46 beyond the carrier face 42 and within the first engagement grooves 38. When the second engagement member 56 is in the engagement position, the engagement portion 62 of the second engagement member 56 is disposed within the second engagement grooves 40. The engagement members 54, 56 preferably have substantially the same profile within the locking plate 16 as a profile of the engagement grooves 38, 40. The release position, as shown by the second engagement member 56 in FIG. 6, has the second engagement portion 62 disposed within the apertures 48 not beyond the carrier face 42. When the second engagement member 56 is in the release position, the second engagement portion 62 of the second engagement member 56 is disposed within the apertures 48 not beyond the carrier face 42.

A first apply biasing element 66 is disposed in each of the first apertures 46 and a second apply biasing element 68 is disposed in each of the second apertures 48. The first apply biasing element 66 is in communication with the lower support portion 52 within the first apertures 46 and with the first engagement portion 58 of the first engagement member 54. The second apply biasing element 68 is in communication with the lower support portion 52 within the second apertures 48 and with the second engagement portion 62 of the second engagement member 56. The first and second apply biasing elements 66, 68 each have an apply force on the engagement members 54, 56. In the example provided, the apply biasing elements 66, 68 are coil springs. However, other biasing elements may be used without departing from the scope of the present disclosure.

Figure 4:
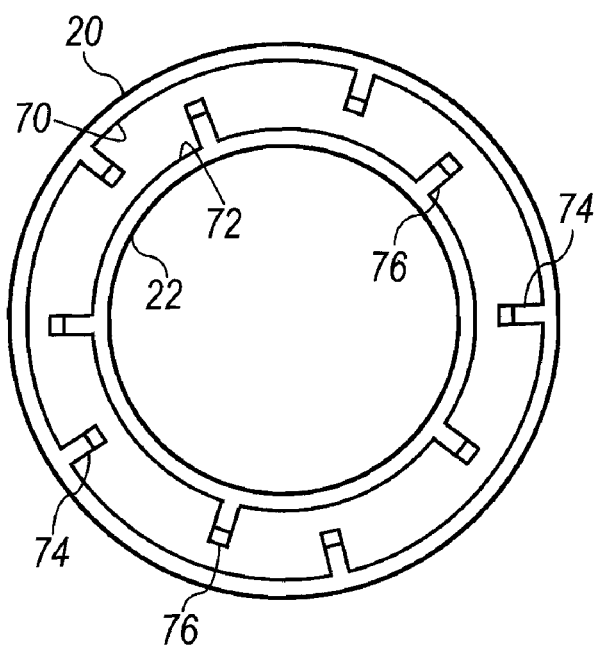
FIG. 4 is a front view, taken in the direction of arrow D-D in FIG. 1, of concentric release plates of the clutch in accordance with the present disclosure.

Referring now to FIG. 4, a front view of the release plates 20, 22 in the direction of arrow D-D of FIG. 1 is shown, in accordance with an embodiment of the disclosure. The release plates 20, 22 are generally annular coaxial plates. The first release plate 20 has an inner diameter 70 that is greater than an outer diameter 72 of the second release plate 22. A plurality of first release members 74 extend radially inward from the inner diameter 70 of the first release plate 20 and a plurality of second release members 76 extend radially outward from the outer diameter 72 of the second release plate 22. The release members 74, 76 also extend axially towards the carrier 18 and communicate with the release portions 60, 64 of the engagement members 54, 56 (See FIG. 6). In the example provided, the first release members 74 are circumferentially aligned with the first release portion 60 of the first engagement members 54 and the second release members 76 are circumferentially aligned with the second release portion 64 of the second engagement members 56 (See FIG. 3). Alternatively, the first release members 74 may align with the second engagement members 56 and the second release members 76 may align with the first engagement members 54.

The release plates 20, 22 are each positionable between an engagement position and a release position. In the engagement positions, the first and second release plates 20, 22 are in contact with the first and second electromagnet housings 24, 26, respectively. In the release positions, the first and second release plates 20, 22 are in contact with the bottom face 44 of the carrier 18.

Figure 5:
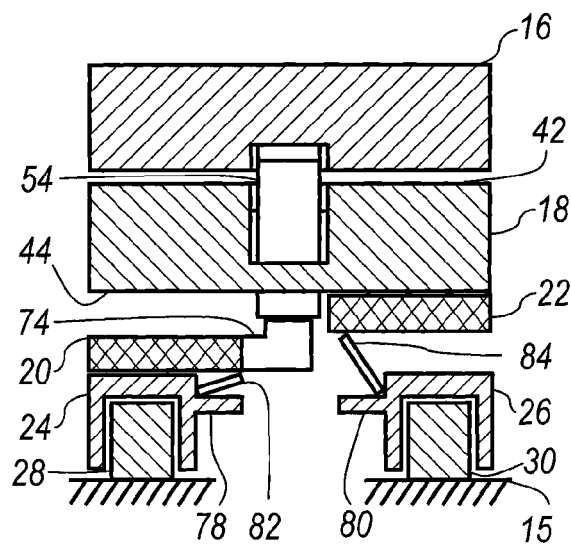
FIG. 5 is a cross-sectional view of the clutch, taken in the direction of arrow E-E in FIG. 3, in a one-way locking condition in accordance with the present disclosure.

Referring now to FIG. 5, a cross sectional view of the clutch 10 in the direction of arrow E-E of FIG. 3 is shown, in accordance with an embodiment of the disclosure. The electromagnets 28, 30 are generally coils in communication with an electrical source and rotatably fixed to the housing 15. The electromagnets 28, 30 produce electromagnetic forces when the electromagnets 28, 30 are energized. The first electromagnet 28 has an electromagnetic force that acts on the first release plate 20, and the second electromagnet 30 has an electromagnetic force that acts on the second release plate 22. The electromagnetic forces act on the release plates 20, 22 so that the release plates 20, 22 move towards the electromagnet housings 24, 26.

In the example provided, the electromagnets 28, 30 are independently controllable between an energized condition ("on") and a non-energized condition ("off"). An intermediate "holding" condition may be used, where the intermediate condition uses a lower current through the electromagnets 28, 30 than is used in the "on" position. Such an intermediate condition may be desirable to minimize power consumption when the release plates 20, 22 are in the engaged positions and the distance between the release plates 20, 22 and the electromagnets 28, 30 is less than the distance between the release plates 20, 22 and the electromagnets 28, 30 in the release positions. The distance between the electromagnets 28, 30 and the release plates 20, 22 in the release position is preferably small to minimize power consumption during actuation of the clutch 10. The clutch 10 has desirable power use characteristics because the electromagnetic forces used to actuate the clutch 10 do not need to overcome or resist the force transmitted from the engagement grooves 38, 40 to the engagement members 54, 56.

The first electromagnet housing 24 is disposed adjacent the first release plate 20 and substantially over the first electromagnet 28. The second electromagnet housing 26 is disposed adjacent the second release plate 22 and substantially over the second electromagnet 30. The first electromagnet 28 and the second electromagnet 30 generally do not rotate. In the example provided, the first electromagnet 28 and the second electromagnet 30 are attached to the housing 15. The first electromagnet housing 24 has an inner shelf portion 78 and the second electromagnet housing 26 has an outer shelf portion 80. The shelf portions 78, 80 project from the electromagnet housings 24, 26 towards the radial midpoint between the electromagnet housings 24, 26. The electromagnet housings 24, 26 generally rotate with respect to the electromagnets 28, 30 on bearings (not shown).

The clutch 10 further includes an outer or first release biasing element 82 and an inner or second release biasing element 84. The first release biasing element 82 is disposed between the first release plate 20 and the inner shelf portion 78 of the first electromagnet housing 24. The second release biasing element 84 is disposed between the second release plate 22 and the outer shelf portion 80 of the second electromagnet housing 26. The first and second release biasing elements 82, 84 each have a release force on the first and second release plates 20, 22, respectively. In the example provided, the release biasing elements 82, 84 are Belleville springs. However, other biasing elements may be used without departing from the scope of the present disclosure.

With combined reference to FIGS. 1-6, the operation of the clutch 10 will now be described. The first engagement member 54 moves to the engagement position when the first electromagnet 28 is energized. The electromagnetic force from the first electromagnet 28 combined with the apply force from the first apply biasing element 66 is greater than the release force from the first release biasing element 82. Thus, the first release plate 20 moves to the engagement position. The apply force on the first engagement portion 58 of the first engagement member 54 rotates the first engagement member 54 about the rotation portion 50 within the first apertures 46 into the first engagement grooves 38.

The first engagement member 54 moves to the release position when the first electromagnet 28 is not energized. The release force from the first release biasing element 82 is greater than the apply force from the first apply biasing element 66. Thus, the first release plate 20 moves to the release position. The release force on the first release portion 60 of the first engagement member 54 is transmitted through the first release members 74 of the first release plate 20. Accordingly, the first engagement member 54 rotates into the release position about the rotation portion 50 within the first apertures 46.

The second engagement members 56 are in the engagement position when the second electromagnet 30 is energized. The electromagnetic force from the second electromagnet 30 combined with the apply force from the second apply biasing element 68 is greater than the release force from the second release biasing element 84. Thus, the second release plate 22 moves to the engagement position. The apply force on the second engagement portion 62 of the second engagement member 56 rotates the second engagement members 56 about the rotation portion 50 within the second apertures 48 into the second engagement grooves 40.

The second engagement members 56 are in the release position when the second electromagnet 30 is not energized. The release force from the second release biasing element 84 is greater than the apply force from the second apply biasing element 68. Thus, the the second release plate 22 moves to the release position. The release force on the second release portion 64 of the second engagement member 56 is transmitted through the second release members 76 of the second release plate 22. Accordingly, the second engagement member 56 rotates into the release position about the rotation portion 50 within the second apertures 48.

The clutch 10 is electrically selectable among four modes of operation. In a first operating condition, as shown in FIGS. 5 and 6, the first engagement member 54 is in the engagement position and the second engagement member 56 is in the release position. The clutch 10 in the first operating condition transmits torque from the locking plate 16 to the carrier 18 in the first direction A and interrupts the transfer of torque from the locking plate 16 to the carrier 18 in the second direction B. The first direction A and the second direction B are shown and discussed as relative directions of rotation of the locking plate 16 with respect to the carrier 18, and may or may not correspond to the absolute rotational directions of the locking plate 16 or the carrier 18. In the first direction A, torque from the first shaft 12 transmits through the locking plate 16 to the first engagement grooves 38, through the first engagement grooves 38 to the first engagement portion 58 of the first engagement member 54, through the first engagement member 54 to the first apertures 46 of the carrier 18, and through the carrier 18 to the second shaft 14. In the second direction B, the first shaft 12 "overruns" the second shaft 14. More specifically, torque from the first shaft 12 through the first engagement grooves 38 of the locking plate 16 rotates the first engagement member 54 temporarily out of engagement with the first engagement grooves 38, interrupting torque transfer from the first shaft 12 to the second shaft 14 in the second direction B.

In a second operating condition the first engagement member 54 is in the release position and the second engagement member 56 is in the engagement position. The clutch 10 in the second operating condition interrupts torque transmission from the locking plate 16 to the carrier 18 in the first direction A and transmits torque from the locking plate 16 to the carrier 18 in the second direction B. In the first direction A, the first shaft 12 "overruns" the second shaft 14. More specifically, torque from the first shaft 12 through the second engagement grooves 40 of the locking plate 16 rotates the second engagement member 56 temporarily out of engagement with the second engagement grooves 40, interrupting torque transfer from the first shaft 12 to the second shaft 14 in the first direction A. In the second direction B, torque from the first shaft 12 transmits through the locking plate 16 to the second engagement grooves 40, through the second engagement grooves 40 to the second engagement portion 62 of the second engagement member 56, through the second engagement member 56 to the second apertures 48 of the carrier 18, and through the carrier 18 to the second shaft 14.

In a third operating condition the first and second engagement members 54, 56 are in the engagement position. The clutch 10 in the third operating condition transmits torque from the locking plate 16 to the carrier 18 in the first and second directions A, B. In the first direction A, torque from the first shaft 12 transmits through the locking plate 16 to the first engagement grooves 38, through the first engagement grooves 38 to the first engagement portion 58 of the first engagement member 54, through the first engagement member 54 to the first apertures 46 of the carrier 18, and through the carrier 18 to the second shaft 14. In the second direction B, torque from the first shaft 12 transmits through the locking plate 16 to the second engagement grooves 40, through the second engagement grooves 40 to the second engagement portion 62 of the second engagement members 56, through the second engagement members 56 to the second apertures 48 of the carrier 18, and through the carrier 18 to the second shaft 14.

In a fourth operating condition the first and second engagement members 54, 56 are in the release position. The clutch 10 in the fourth operating condition interrupts torque transmission from the locking plate 16 to the carrier 18 in the first and second directions A, B. The engagement portions 58, 62 of the engagement members 54, 56 are disposed in the apertures 46, 48, and do not interact with the engagement grooves 38, 40.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

What is claimed is:

1. A clutch for transmitting torque between a first member and a second member, the clutch comprising:
   a locking plate having a first engagement groove;
   a carrier disposed adjacent the locking plate, the carrier including a first aperture;
   a first engagement member rotatably supported in the first aperture of the carrier, the first engagement member having an actuating portion and an engagement portion, wherein the first engagement member is rotatable into an engagement position and a release position, and wherein the engagement portion of the first engagement member is disposed in the first engagement groove when the first engagement member is in the engagement position;
   a first apply biasing element having an apply force for rotating the first engagement member into the engagement position;
   a first release plate in communication with the actuating portion of the first engagement member; and
   a first release biasing element having a release force for rotating the first engagement member into the release position; and
   a first electromagnet disposed proximate the release plate, the first electromagnet having an electromagnetic force,
   wherein the first engagement member is in the engagement position when a combination of the apply force and the electromagnetic force is greater than the release force,
   and wherein the first engagement member moves to the release position when the release force is greater than the combination of the apply force and the electromagnetic force.

2. The clutch of claim 1, further comprising a second engagement groove in the locking plate, a second aperture in the carrier, a second engagement member disposed in the second aperture and opposing the first engagement member, a second apply spring disposed within the second aperture, a second release plate adjacent the carrier, a second release biasing element, and a second electromagnet disposed proximate the second release plate.

3. The clutch of claim 2, wherein the first release plate and the second release plate are concentric annular members.

4. The clutch of claim 2, wherein the first release plate further includes an inner diameter and a first actuation portion disposed inside of the inner diameter and the second release plate further includes an outer diameter and a second actuation portion disposed outside of the outer diameter.

5. The clutch of claim 4, wherein the first actuation portion includes a first insertion portion in contact with the actuation portion of the first engagement member and the second actuation portion includes a second insertion portion in contact with a second actuation portion of the second engagement member.

6. The clutch of claim 2, further comprising a first electromagnet housing disposed over the first electromagnet and a second electromagnet housing disposed over the second electromagnet.

7. The clutch of claim 6, wherein the first electromagnet housing includes a first shelf portion and the second electromagnet housing includes a second shelf portion, wherein the first release biasing member is disposed on the first shelf portion and second release biasing member is disposed on the second shelf portion.

8. The clutch of claim 2, wherein the first release biasing member and the second release biasing member are Belleville springs.

9. The clutch of claim 2, wherein the carrier includes a rotation portion adjacent the first aperture that defines the axis of rotation of the first engagement member.

10. The clutch of claim 2, further comprising a plurality of first engagement members and a plurality of second engagement members.

11. The clutch of claim 2, wherein a distance between the first engagement groove and the second engagement groove is substantially the same as a distance between the first engagement member and the second engagement member.

12. The clutch of claim 1, wherein the carrier has a shelf portion adjacent the first aperture and the first apply biasing element is a coil spring disposed between the shelf portion and the engagement portion of the first engagement member.

13. The clutch of claim 1, wherein the first engagement groove has a profile that is substantially the same as a profile of a portion of the first engagement member within the first engagement groove.

14. A clutch for transmitting torque between a first member and a second member in a vehicle, the clutch comprising:
   a locking plate having a pair of engagement grooves;
   a carrier disposed adjacent the locking plate, the carrier including a pair of apertures;
   an pair of opposing engagement members rotatably supported in the pair of apertures of the carrier, the pair of engagement members each having an actuating portion and an engagement portion, wherein each of the pair of engagement members is rotatable into an engagement position and a release position, and wherein the engagement portion of at least one of the pair of engagement members is disposed in a respective one of the pair of engagement grooves in the engagement position;
   a pair of apply biasing elements each having an apply force for rotating a respective one of the pair of engagement members into the engagement position;
   a pair of release plates each in communication with the actuating portion of a respective one of the pair of engagement members; and
   a pair of release biasing elements each having a release force for rotating a respective one of the pair of engagement members into the release position; and
   a pair of electromagnets disposed proximate the release plate, each of the pair of electromagnets having an electromagnetic force,
   wherein each of the pair of engagement members moves to the engagement position when a combination of the respective apply force and the respective electromagnetic force is greater than the respective release force, and wherein each of the engagement members is in the release position when the respective release force is greater than the combination of the respective apply force and the respective electromagnetic force.

15. The clutch of claim 14, wherein the pair of release plates are concentric annular plates.

16. The clutch of claim 14, wherein the release biasing elements are concentric Belleville springs.

17. The clutch of claim 14 further comprising a pair of electromagnetic housings disposed over the pair of electromagnets, and wherein the pair of electromagnetic housings are rotatable relative to the pair of electromagnets.

18. The clutch of claim 14, wherein the carrier further includes a shelf portion and the pair of apply biasing elements are disposed on the shelf portion.

19. The clutch of claim 14 further comprising a plurality of pairs of opposing engagement members.

20. The clutch of claim 14, wherein the pair of engagement grooves have profiles that are substantially the same as a profile of a portion of each of the pair of opposing engagement members within the locking plate.

* * * * *